Patented Mar. 6, 1923.

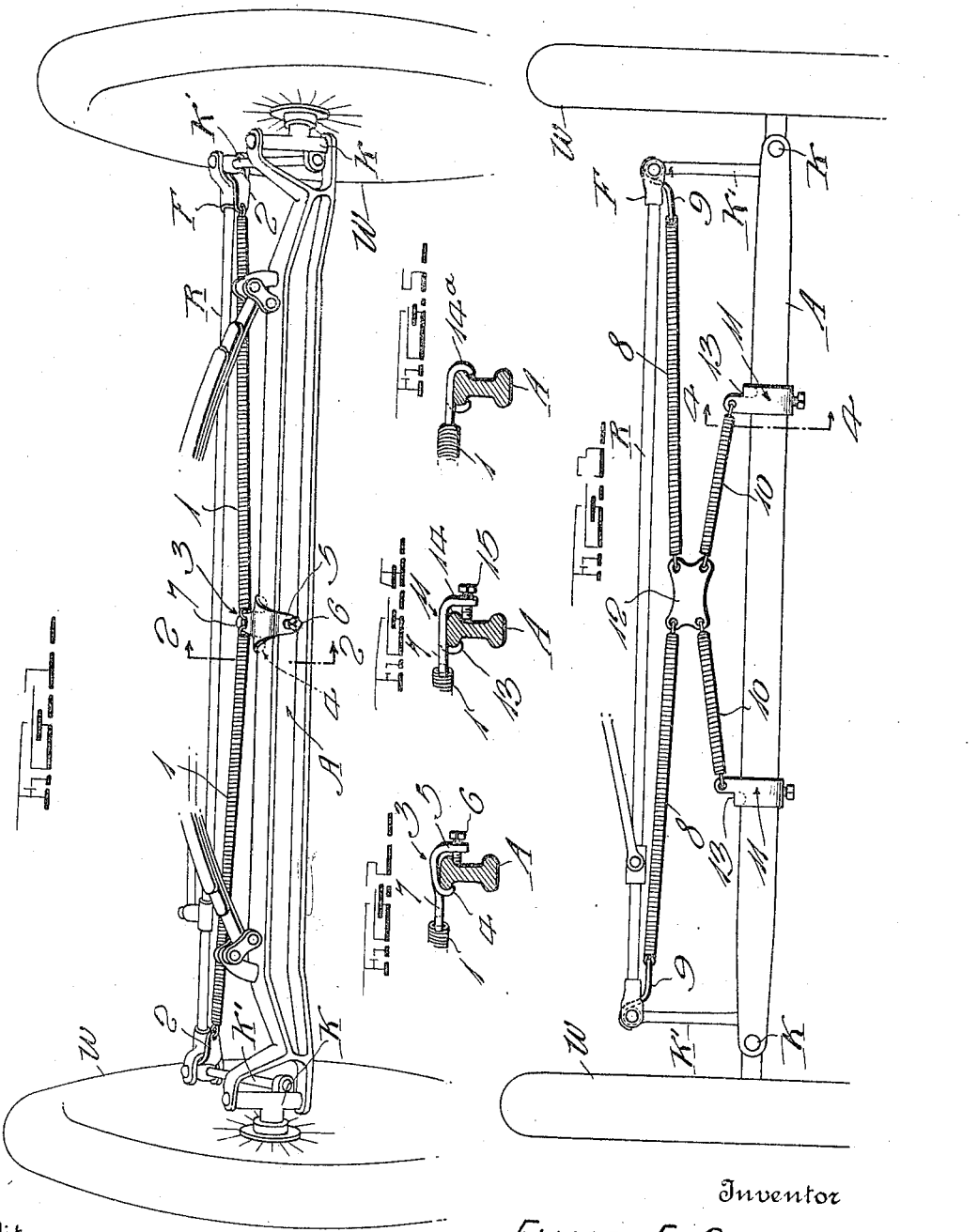

1,447,757

UNITED STATES PATENT OFFICE.

ELMER E. CANNON, OF WAUKOMIS, OKLAHOMA.

STEERING-MECHANISM EQUALIZER.

Application filed April 6, 1922. Serial No. 550,227.

*To all whom it may concern:*

Be it known that ELMER E. CANNON, a citizen of the United States, residing at Waukomis, in the county of Garfield and State of Oklahoma, has invented certain new and useful Improvements in Steering-Mechanism Equalizers; and I do declare the following to be a full, clear, and exact description of the invention, such as will enable others skilled in the art to which it appertains to make and use the same.

This invention relates to an improved equalizer for use on the steering mechanism of an automobile.

One object of the invention is to generally improve upon devices of this class by providing one of extreme simplicity and durability which is practical, effective in operaton, and such in construction that the outer ends of the coiled springs are simply connected with the parts of the steering mechanism by hooks which serve to permit quick attachment and detachment of the springs.

Another object of the invention is to provide an equalizing device embodying a double arrangement of springs associated with the steering mechanism and axle, the same being arranged in such relation as to exert equal tension on both steering knuckles to insure that the wheels will be disposed in the proper parallelism with respect to one another.

Other objects and advantages of the invention will be apparent during the course of the following description.

In the accompanying drawings forming a part of this specification and in which like numerals are employed to designate like parts throughout the same, Figure 1 is a perspective view of an automobile axle and a part of the steering mechanism showing the improved equalizer associated therewith.

Figure 2 is a transverse vertical section taken on the line 2—2 of Figure 1.

Figure 3 is a top plan view of a modified form of the invention.

Figure 4 is a section taken on line 4—4 of Figure 3.

Figure 5 is a view similar to Figure 4 showing a modified type of clamp.

In the drawings, the letter A designates a front automobile axle, at the opposite ends of which are the wheels W, these being connected with the axle by customary knuckles K. Disposed in parallelism with and in spaced relation in rear of the axle is the transverse connecting rod R of the steering mechanism. As is usual, the rod is formed at its outer ends with forks having pivotal connection with arms K' which extend rearwardly from and are carried by the knuckles K. Ordinarily, there is considerable loss of motion between these parts and other details of the steering mechanism. Due to this, considerable trouble is experienced when driving an automobile to steer it. As before intimated, it is my aim to utilize a device which will prevent this loose relative movement between the parts of the steering mechanism so that it will be possible to more easily steer, as undue wiggling of the wheels will be prevented.

The preferred form of device for accomplishing these ends is shown in figure 1. By directing attention to this figure it will be seen that the improved device comprises a pair of comparatively strong coiled springs 1 having hooks 2 at their outer ends in detachable engagement with the small knuckles of aforesaid connecting rod arms K. At their inner ends, the springs are connected to a novel clamp 3 which is adjustably connected with the axle A. Although this clamp could be constructed otherwise, it is formed from a metal plate including hooks 4 (see Figure 2) for engagement with the top flange of the axle, and a laterally depending part 5 having a threaded aperture through which a binding part 6 passes. This screw as is obvious is designed to bear at its inner end against the axle. Between the hooks 4, the plate is equipped with a rearwardly extending tongue 7 having an aperture with which the inner ends of the springs 1 are connected.

The above invention just described is installed as is clearly shown in Figure 1, the hooks 2 being engaged with the knuckles at the ends of the connecting rod R of the steering mechanism and a clamp 3 being positioned at the approximate center of the axle and the binding screw tightened to maintain it in a set position. At this time, both springs are stretched and under tension and exert a pull in a manner to prevent excessive relative movement between the steering rod and its connections with the steering knuckles. Ordinarily, when the clamp 3 is placed in the center of the axle it will suffice to act on both wheels in the same manner and will tend to hold them in true parallelism to enable the vehicle to be steered "straight ahead." If for any reason the vehicle would be inclined to go toward the left or toward the right, this may be remedied by relaxing the tension of one spring and placing the other spring at a greater tension by adjusting the clamp 3 toward the proper end of the axle. Hence, the tension of the springs may be adjusted to render the device highly effective in operation.

It may not be desirable to employ the type of equalizer hereinbefore described in all instances, and I propose to sometimes use a slightly different form. I therefore direct attention to Figure 3 wherein this modified form of the invention is clearly illustrated. Reference being had to this figure, it will be seen that the form of the invention as shown comprises a pair of long coiled springs 8 having hooks 9 at their outer ends to engage the knuckles at the corresponding ends of the connecting rod R. Associated with these long springs is a pair of relatively short springs 10 which are connected with and diverge from the axle of the vehicle. These short springs 10 are connected at their outer ends with a clamp 11, and all four of the springs are connected at their inner ends with a plate 12 which is disposed midway between the axle and steering rod when the device is in position for use. In construction the clamps 11 simulate the clamp 3, that is, the clamps 11 are also formed with hooks 13 to engage the head of the axle 8 with a depending part 14 having an aperture for passage of the set-screw 15 and an anchoring tongue 16 with which the outer end of the springs 10 are connected. It may be conveniently stated here that it is not essential in all instances to employ a binding screw and in some instances, as seen in Figure 5, the depending part 14ª of the clamp shown in this figure may be simply bent around the axle as shown to frictionally grip it. This form of clamp is more desirable from the manufacturer's viewpoint in that it can be manufactured and sold for a comparatively small cost. The tendency of this form of clamp to cant and have its edges bite into the axle due to the pull of the springs, serves to hold the clamp against undue slippage. It is obvious that this form of the invention acts substantially in the same manner as the form first described and it is also apparent that in order to vary the tension of one or the other of the long springs 8, the spring 10 and clamps 11 must be properly adjusted toward one or the other ends of the axle.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. An equalizer for the steering mechanism of an automobile comprising two pairs of coiled springs, one pair of which is comparatively long, the springs being designed for connection at their outer ends to the knuckles at the corresponding ends of one of the steering rods, the remaining pair of springs being comparatively short and designed for connection at their outer ends with the axle, and a plate to which the inner ends of both pairs of springs are connected.

2. An equalizing device for the steering mechanism of a vehicle comprising two pairs of coiled springs, the springs of one pair being comparatively long and the springs of the other pair being comparatively short, a plate having apertures in its corners with which all the springs are connected at their inner ends, a pair of hooks connected with the outer ends of the long springs, and adjustable clamps connected to the corresponding ends of the short springs.

In testimony whereof I have hereunto set my hand in the presence of two subscribing witnesses.

ELMER E. CANNON.